United States Patent
Barritt et al.

(10) Patent No.: US 11,923,956 B2
(45) Date of Patent: *Mar. 5, 2024

(54) NETWORKING WITH HAPS AND ADDITIONAL GROUND-BASED NODES

(71) Applicant: Aalyria Technologies, Inc., Livermore, CA (US)

(72) Inventors: Brian Barritt, San Jose, CA (US); Mauro de Oliveira Filho, Los Gatos, CA (US)

(73) Assignee: Aalyria Technologies, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,268

(22) Filed: Feb. 13, 2023

(65) Prior Publication Data
US 2023/0198606 A1    Jun. 22, 2023

Related U.S. Application Data

(63) Continuation of application No. 17/527,319, filed on Nov. 16, 2021, now Pat. No. 11,611,389, which is a (Continued)

(51) Int. Cl.
*H04B 7/185* (2006.01)
*G08G 1/00* (2006.01)
(Continued)

(52) U.S. Cl.
CPC ........... *H04B 7/18504* (2013.01); *G08G 1/20* (2013.01); *H04B 7/18506* (2013.01);
(Continued)

(58) Field of Classification Search
CPC ............ H04B 7/18504; H04B 7/18506; H04B 10/118; H04B 10/29; H04B 10/40; H04B 10/27; H04W 76/10
See application file for complete search history.

(56) References Cited

U.S. PATENT DOCUMENTS

| 6,327,533 | B1 * | 12/2001 | Chou ...................... G01S 19/49 701/472 |
| 9,647,748 | B1 * | 5/2017 | Mitchell ............ H04B 7/18508 |
| 10,193,761 | B1 | 1/2019 | Barritt |
| 10,554,499 | B2 | 2/2020 | Barritt et al. |

(Continued)

OTHER PUBLICATIONS

Brian Barritt et al., Operating a UAV Mesh & Internet Backhaul Network using Temporospatial SDN, 978-1-5090-1613-6/17/31.0 2017 IEEE and Google.

*Primary Examiner* — Brenda H Pham
(74) *Attorney, Agent, or Firm* — Platinum Intellectual Property; Michelle C. Dunn

(57) ABSTRACT

Aspects of the disclosure provide for determining a network configuration. For instance, a system may include a controller including one or more processors. The one or more processors may be configured to receive information from each of a plurality of available nodes within a network, the plurality of available nodes including at least one aerial vehicle; determine a plurality of constraints for a future point in time, each one of the plurality of constraints including one or more minimum service requirements for a geographic area; attempt to determine a first network configuration for each of the plurality of available nodes that satisfies all of the constraints; when unable to determine the first network configuration, determine a second network configuration for the plurality of available nodes and at least one additional ground-based node that satisfies all of the constraints; and send instructions in order to affect the second network configuration.

20 Claims, 7 Drawing Sheets

Related U.S. Application Data continuation of application No. 16/715,775, filed on Dec. 16, 2019, now Pat. No. 11,211,997.

(51) Int. Cl.
    *H04B 10/118*    (2013.01)
    *H04B 10/27*     (2013.01)
    *H04B 10/29*     (2013.01)
    *H04B 10/40*     (2013.01)
    *H04W 76/10*     (2018.01)

(52) U.S. Cl.
    CPC ........... *H04B 10/118* (2013.01); *H04B 10/27* (2013.01); *H04B 10/29* (2013.01); *H04B 10/40* (2013.01); *H04W 76/10* (2018.02)

(56) References Cited

U.S. PATENT DOCUMENTS

| | | | |
|---|---|---|---|
| 11,211,997 B2 * | 12/2021 | Barritt | H04B 10/40 |
| 2009/0082040 A1 * | 3/2009 | Kahn | G01S 13/825 |
| | | | 455/457 |
| 2018/0123678 A1 | 5/2018 | Frolov et al. | |
| 2018/0316429 A1 * | 11/2018 | Barritt | H04B 10/118 |
| 2019/0173738 A1 | 6/2019 | Medina et al. | |

\* cited by examiner

200

| | GROUND STATION 107A | GROUND STATION 107B | HAP 110A | HAP 110B | HAP 110C | HAP 110D | LINK 130 |
|---|---|---|---|---|---|---|---|
| CURRENT TIME | AVAILABLE | AVAILABLE | AVAILABLE | AVAILABLE | UNAVAILABLE | AVAILABLE | AVAILABLE |
| | | | LOCATION A | | LOCATION C | | HIGH BAND-WIDTH |
| | | | CLEAR WEATHER | | CLEAR WEATHER | | |
| FUTURE TIME | AVAILABLE | AVAILABLE | UNAVAILABLE | AVAILABLE | UNAVAILABLE | AVAILABLE | UNAVAILABLE |
| | | | LOCATION B | | | | |
| | | | THUNDER-STORM | | | | |

| LINK 131 | LINK 132 | LINK 133 | LINK 134 | LINK 135 | LINK 136 | LINK 137 |
|---|---|---|---|---|---|---|
| AVAILABLE | AVAILABLE | UNAVAILABLE | AVAILABLE | AVAILABLE | AVAILABLE | AVAILABLE |
| HIGH BAND-WIDTH | LOW BAND-WIDTH | | HIGH BAND-WIDTH | LOW BAND-WIDTH | LOW BAND-WIDTH | HIGH BAND-WIDTH |
| UNAVAILABLE | UNAVAILABLE | UNAVAILABLE | AVAILABLE | AVAILABLE | AVAILABLE | AVAILABLE |

NETWORKING WITH HAPS AND ADDITIONAL GROUND-BASED NODES

CROSS REFERENCE TO RELATED APPLICATIONS

The present application is a continuation of U.S. patent application Ser. No. 16/715,775, filed Dec. 16, 2019, the entire disclosure of which is incorporated herein by reference.

BACKGROUND

Information can be transmitted over directional point-to-point networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth.

BRIEF SUMMARY

Aspects of the disclosure provide a method of a method of determining a network configuration. The method includes receiving, by one or more processors, information from each of a plurality of available nodes within a network, wherein the plurality of available nodes includes at least one high-altitude platform; determining, by the one or more processors, a plurality of constraints for a future point in time, each one of the plurality of constraints including one or more minimum service requirement for a geographic area; attempting, by the one or more processors, to determine a first network configuration for each of the plurality of available nodes that satisfies all of the constraints for the future point in time; when unable to determine the first network configuration, determining, by the one or more processors, a second network configuration for the plurality of available nodes and at least one additional ground-based node that satisfies all of the constraints for the future point in time; and sending, by the one or more processors, instructions in order to affect the second network configuration at the future point in time.

In one example, the second network configuration includes a communication link between the at least one high-altitude platform and the at least one additional ground-based node. In another example, determining the second network configuration includes using location information for the at least one ground-based additional node as well as information about geographic locations the ground-based additional node is able to reach over one or more given periods of time. In another example, determining the second network configuration includes using information about an altitude at which the at least one ground-based additional node is deployable. In another example, determining the second network configuration includes using information about communication capabilities of the at least one ground-based additional node. In another example, determining the second network configuration includes limiting a number of any ground-based additional nodes used in the second network configuration. In another example, the method also includes, when unable to determine the first network configuration, sending, by the one or more processors, a signal to a fleet management system remote from the one or more processors and in response to sending the signal, receiving information identifying the at least one additional ground-based node such that determining the second network configuration is based on the received information. In another example, sending the instructions in order to affect the second network configuration at the future point in time includes sending a signal identifying the network configuration to a fleet management system including one or more processors. In this example, the method also includes, in response to receiving, by the fleet management system, the signal, sending a second signal to cause the one or more additional ground-based nodes to be dispatched. In addition or alternatively, the method also includes determining, by the fleet management system, a flight map for the at least one high-altitude platform.

Another aspect of the disclosure provides a system for determining a network configuration. The system includes a controller including one or more processors configured to receive information from each of a plurality of available nodes within a network, the plurality of available nodes including at least one high-altitude platform; determine a plurality of constraints for a future point in time, each one of the plurality of constraints including one or more minimum service requirements for a geographic area; attempt to determine a first network configuration for each of the plurality of available nodes that satisfies all of the constraints for the future point in time; when unable to determine the first network configuration, determine a second network configuration for the plurality of available nodes and at least one additional ground-based node that satisfies all of the constraints for the future point in time; and send instructions in order to affect the second network configuration at the future point in time. In one example, the second network configuration includes a communication link between the at least one high-altitude platform and the at least one additional ground-based node. In another example, the one or more processors are configured to determine the second network configuration by using location information for the at least one ground-based additional node as well as information about geographic locations the ground-based additional node is able to reach over one or more given periods of time. In another example, the one or more processors are configured to determine the second network configuration by using information about an altitude at which the at least one ground-based additional node is deployable. In another example, the one or more processors are configured to determine the second network configuration by using information about communication capabilities of the at least one ground-based additional node. In another example, the one or more processors are further configured to, when unable to determine the first network configuration, send a signal to a fleet management system remote from the one or more processors and in response to sending the signal, receive information identifying the at least one additional ground-based node such that determining the second network configuration is based on the received information. In another example, the one or more processors are configured to send the instructions in order to affect the second network configuration at the future point in time includes sending a signal identifying the network configuration to a fleet management system. In another example, the system also includes the fleet management system, and wherein the fleet management system includes one or more processors. In this example, the one or more processors of the fleet management system are configured to, in response to receiving the signal, send a second signal to cause the one or more additional ground-based nodes to be dispatched.

BRIEF DESCRIPTION OF THE DRAWINGS

FIG. 4 is an example table 400 in accordance with aspects of the disclosure.

FIG. 7 is a functional diagram of another topology of the network shown in

FIG. 1 with an additional ground-based node in accordance with aspects of the disclosure.

DETAILED DESCRIPTION

Overview

Figure 1:
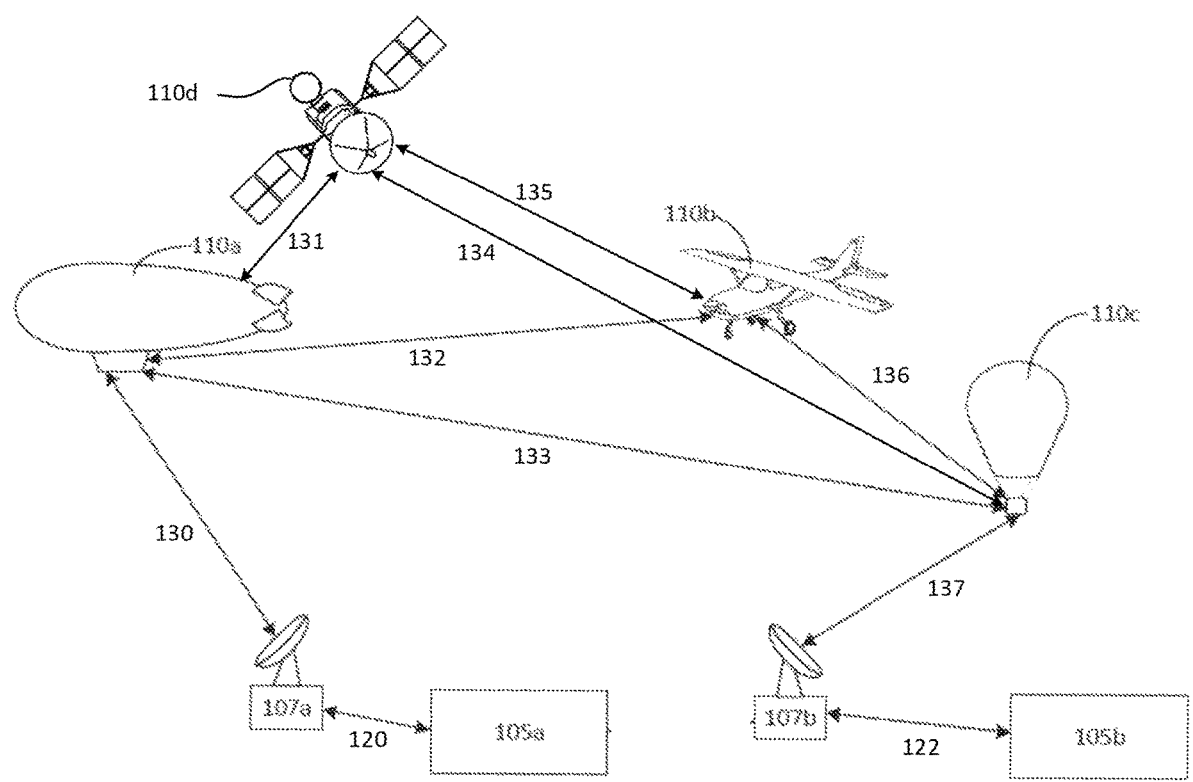
FIG. 1 is a pictorial diagram of an example directional point-to-point network 100 in accordance with aspects of the disclosure.

The technology relates to determining network configurations for an aerospace communication network using a controller. Particularly, the controller may be used in aerospace communication networks that include non-geostationary satellite orbit (NGSO) satellites, such as Low Earth Orbit (LEO) satellites, or other high-altitude platforms (HAPs) as nodes. The controller may schedule and implement the services and applications that control, monitor, and reconfigure the network layer and switching functionality.

The configuration of the controller may be dependent upon the types of network communications provided. For instance, the controller may include a Temporospatial Software-Defined Networking (TS-SDN) operating system; or, with or in a 5G reference architecture using a 5G radio access or integrated access and backhaul or other configurations, the same or similar functionality could be implemented in the central unit—control plane (CU-CP) or another function in the 5G Core.

In operation, the controller may periodically update a list of available nodes, such as, for example, NGSO satellites configured for radio frequency (RF) and/or free-space optical communication (FSOC), and available routes, or flows, through the aerospace network. The list may include a schedule of the available nodes and available flows. The availability of nodes and flows may be based on at least a forecast of the trajectory of moving nodes. The controller may automatically schedule the tasking of communication terminals on the HAPs or ground stations and transmit the schedule to the communication terminals to synchronize changes to the network according to the schedule.

The controller may schedule the tasking of the communication terminals in the network based at least in part on a difference between an amount of bandwidth servicing a given ground station or a given geographic area and a minimum service requirements (e.g. meets service level obligations for throughput and/or latency or network connectivity). For instance, the controller may determine a network configuration including locations of the devices as well as communication links through the network in order to achieve the minimum service requirements for a particular location for a future point in time. In the case of HAPs including aerial vehicles such as UAVs, balloons, etc., as part of the solution, the controller or another server computing system which functions as a fleet management system may also generate flight paths or maps for these aerial vehicles to reach a desired location at the future point in time.

However, in some instances, the controller may be unable to determine or solve for a network configuration that meets all of the constraints, or rather, achieves the minimum service requirements for all geographic areas at the future point in time. For instance, it may take too long for a particular HAP to reach a given location, a HAP may have gone out of service or become unavailable unexpectedly, there are simply not enough available nodes, etc. As a result, no matter what network configuration, there may be an outage at a particular area or the minimum service requirement may not be achievable.

In such instances, the controller may attempt to supplement the available notes with ground-based additional nodes. This may be achieved by the controller itself, or by a fleet management system, for instance, in response to a signal from the controller. These additional nodes may include, for example, a movable ground-based node.

The controller or the fleet management system may access information about any available ground-based additional nodes. The controller or fleet management system may then use the other information and the information about any available ground-based additional nodes in order to attempt to solve for a network configuration that satisfies all of the constraints. The controller or fleet management system may attempt to solve for a network configuration that both satisfies all of the constraints while at the same time minimizes the number of additional nodes used. This may reduce the costs of configuring the network because there are costs involved with getting the additional nodes to the locations. The controller or fleet management system may then send instructions to implement the network configuration.

The features described above may provide for a reliable way for users to transmit data to different parts of the world. A communication network created using the features described may provide users with network coverage that is more robust to fade and outages. Because of this, end users of the communication network are more likely to use the network because it may provide more reliable transmission of data. In addition, because of the mobility of the nodes end users may therefore have increased accessibility to datacenters and other points of interest worldwide. Cost may also be a significant benefit. For example, covering a large, rural area with towers or aerostats is not generally economical, because each base station will likely too few users relative to such users' per-unit fixed costs. HAPS can affordably cover very wide areas; however, they may not offer high-enough availability. The dynamic orchestration of the deployment and network configuration of road-mobile temporary base stations may enable rural coverage to be much more economically sustainable.

EXAMPLE SYSTEMS

FIG. 1 is a block diagram of an example directional point-to-point network 100. The network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of two ground stations 107a and 107b (generally referred to as ground stations 107), and nodes associated with each of four airborne high altitude platforms (HAPs) 110a-110d (generally referred to as HAPs 110). As shown, HAP 110a is a blimp, HAP 110b is an airplane, HAP 110c is a balloon, and HAP 110d is a satellite. In some embodiments, nodes in network 100 may be equipped to perform FSOC, making network 100 an FSOC network. Additionally or alternatively, nodes in network 100 may be equipped to communicate via radio-frequency signals or other communication signal capable of travelling through free space. Arrows shown between a pair of nodes represent possible communication links 120, 122, 130-137 between the nodes. The network 100 as shown in FIG. 1 is illustrative only, and in some implementations the network 100 may include additional or different nodes. For example, in some implementations, the network 100 may include additional HAPs, which may be balloons, blimps, airplanes, unmanned aerial vehicles (UAVs), satellites, or any other form of high-altitude platform.

In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, HAPs 110 can include wireless transceivers associated with a cellular or other mobile network, such as eNodeB base stations or other wireless access points, such as WiMAX or UMTS access points. Together, HAPs 110 may form all or part of a wireless access network. HAPs 110 may connect to the datacenters 105, for example, via backbone network links or transit networks operated by third parties. The datacenters 105 may include servers hosting applications that are accessed by remote users as well as systems that monitor or control the components of the network 100. HAPs 110 may provide wireless access for the users, and may route user requests to the datacenters 105 and return responses to the users via the backbone network links.

Figure 2:
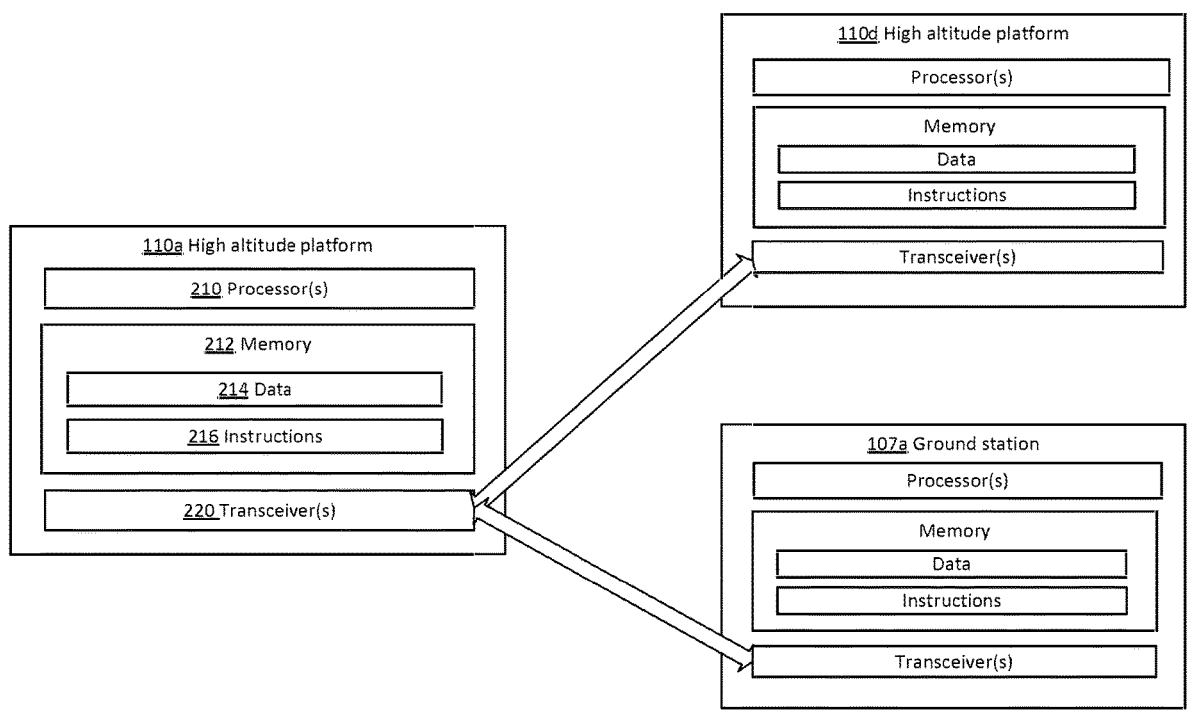
FIG. 2 is a functional diagram of a portion of the network shown in FIG. 1 in accordance with aspects of the disclosure.

As shown in FIG. 2, each node, such as ground stations 107 and HAPs 110 may include one or more transceivers configured to create one or more links, such as links 130-137, between a given HAP 110 and another node in the network. Referring to HAP 110a, each of the nodes, such as ground stations 107 and HAPs 110 of network 100, may include one or more processors 210, memory 212, and one or more transceivers 220. For the sake of clarity and simplicity, only ground station 107a and HAPs 110a, 110d are shown in FIG. 2. However, other ground stations and HAPs in the network may have the same or as similar configuration as ground station 107 or HAPS 110a, 110d.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 stores information accessible by the one or more processors 210, including data 214, and instructions 216, that may be executed by the one or more processors 210. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110a, a routing table may be stored that indicate how signals received at each node should be routed, or transmitted. For example, the routing table stored in memory 212 may indicate that a signal received from ground station 107a should be routed to HAP 110d.

Data 214 may be retrieved, stored or modified by the one or more processors 210 in accordance with the instructions 216. For instance, although the system and method is not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may be mounted to actuators that can be controlled, or steered, to point in a desired direction. To form a link between two nodes, such as the node associated with the HAP 110a and the node associated with the HAP 110d, the transceivers of the respective nodes can be controlled to point in the direction of one another so that data can be sent and received between the nodes. In some implementations, the power of the signals transmitted by each transceiver can also be controlled by the one or more processors of respective nodes to facilitate formation of the links 130-137 in the network 100 (see FIG. 1, for instance). For example, nodes that are separated by a relatively large distance can be configured to operate at a higher power to compensate for the reduction in signal-to-noise ratio that occurs over the distance separating the two nodes. Nodes that are spaced nearer to one another may be controlled to operate at a relatively lower power so as to save power.

Figure 3:
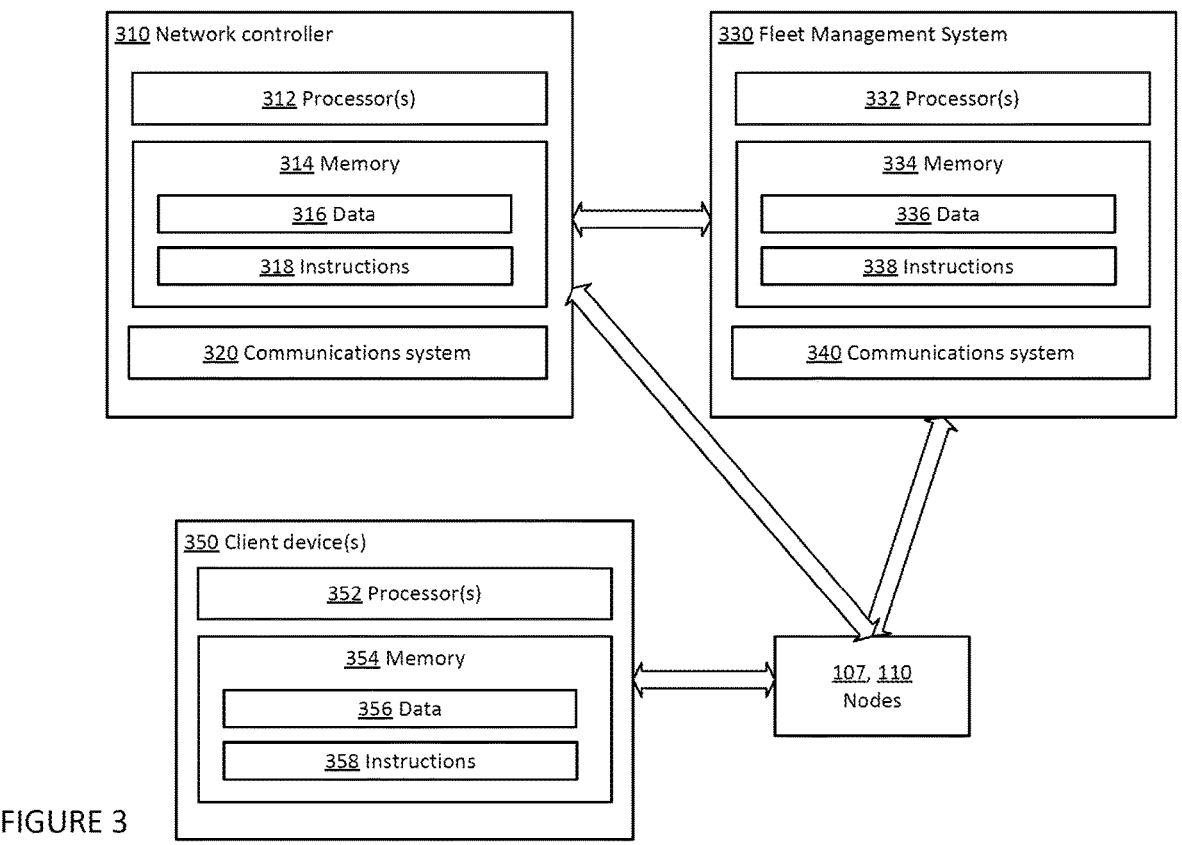
FIG. 3 is a functional diagram of a controller and fleet management system in accordance with aspects of the disclosure.

In some implementations, the network 100 can be an SDN that is controlled by an SDN controller, such as network controller 310, in conjunction with a fleet management system 340, depicted in FIG. 3. Although the controller 310 and fleet management system 340 are depicted as distinct systems, the controller 310 and fleet management system 340 may actually be incorporated in to the same server computing device or server computing devices operating together as a server farm.

The specific implementation of the controller may be dependent upon the types of network communications provided. For instance, the controller may include a Temporospatial Software-Defined Networking (TS-SDN) operating system for use with or in a 5G reference architecture using a 5G radio access or integrated access and backhaul or other configurations, the same or similar functionality could be implemented in the central unit—control plane (CU-CP) or as a function in the 5G Core.

The controller 310 may be located at one of the network nodes or at a separate platform, such as, for example, in one of the datacenters 105. The nodes of the network 100 can be configured to communicate with one another using the steerable transceivers, such as the one or more transceivers 220. As the HAPs 110 move with respect to one another and with respect to the datacenters 105 and ground stations 107 over time, some of the links shown in the block diagram of FIG. 1 may become infeasible. For example, the link 130 between the ground station 107a and the HAP 110a may not be feasible when the path of the HAP 110a brings the HAP 110a into a position in which it is out of range of the ground station 107a, or in which the earth is positioned between it and the ground station 107a. Thus, due to the continuous movement of the HAPs 110, the topology of the network 100 may require regular (i.e. periodic) or irregular reconfiguration to maintain connectivity and to satisfy determined network flows. The controller 310 may be configured to send control messages to the network 100 to configure the topology of the network 100, to pass routing information to the nodes 107, 110 of the network 100, to communication with the fleet management system 330 as discussed further below, as well as to schedule changes to the topology of the network 100 to transmit client data.

The controller 310 may actually include one or more server computing devices each having one or more processors. The server computing devices may be configured as a load-balanced server farm or other configuration. In this regard, as shown in FIG. 3, the controller 310 may include one or more processors 312, memory 314 storing data 316 and instructions 318, as well as a communications system 320. The one or more processors 312 may be similar to the one or more processors 210 described above.

Memory 314 may store information accessible by the one or more processors 312, including data 316 and instructions 316 that may be executed by the one or more processors 312. Memory 314, data 316, and instructions 318 may be configured similarly to memory 212, data 214, and instructions 216 described above. The data 316 may include a table, database, graph or other datastore representing all of the available nodes and possible links in the network 100 at a given time or time frame, such as table 400 in FIG. 4.

The table 400 may have a column for every node and link in the network 100 and a row for a time or time frame. In some cases, the columns and the rows may be reversed. The table 400 may also store, for each node and each link, scheduled times or time frames during which the node or link is available. The data 316 may also store a model of each node in the network. Each model may contain information that can be used to propagate each HAP's predicted physical motion over time as well as network capabilities. For instance, each model may contain information about the current locations of the available nodes of the network (location, power, bandwidth and communication capabilities including steering capabilities, antenna patterns, supported bands & channels, networking interfaces, etc.), terrain, local obstructions (on the HAP or nearby), location of the sun or other planetary bodies (if the HAP is located in deep space and there is a possibility of obstruction by a moon or planet).

The data 316 may be used by the controller 110 and/or fleet management system 330 in order to calculate the table 400 for all possible links or beam tasks over time. These may either be proactively pre-computed or computed on-demand based on at least a forecast of the trajectory of moving nodes. In this regard, the table may provide a list of available nodes, such as, for example, NGSO satellites configured for free-space optical communication (FSOC) or RF, and available routes, or flows, through the aerospace network. The list may include a schedule of the available nodes and available flows. The availability of nodes and flows may be based on at least a forecast of the trajectory of moving nodes. The available flows through the aerospace network from a given region to all other available regions may be advertised from a Software-Defined Networking (SDN)-enabled router in the given region. The controller 110 may solve for the desired flows through the network using table 400 as well as a plurality of constraints (discussed further below) as its input. The output of the controller may include a network configuration for a future point in time that identifies links or beam tasks, power or channel assignments, and routing configurations that should be used over time in order to achieve minimum service requirements as discussed further below. This information may then be conveyed to the various nodes of the network as needed.

Returning to FIG. 3, the communications system 340 may be configured to communicate with the nodes 107, 110 of network 100 as well as the fleet management system 330. In some embodiments, the communication system 320 includes a Control to Data-Plane Interface (CDPI) driver configured to communicate with a CDPI agent at each of the nodes 107, 110. In addition, the communications system 320 of the controller 310 may include one or more northbound interface (NBI) agents configured to communicate with an NBI driver at each client device 350 associated with one or more SDN applications. The communication system 320 may optionally or alternatively be configured to transmit and receive a signal via radio frequencies, optical frequencies, optical fiber, cable, or other communication means to and from the nodes 107, 110 in the network 100, the fleet management system 330, and/or the one or more client devices 350.

As with the controller 310, the fleet management system 330 may actually include one or more server computing devices each having one or more processors. The server computing devices may be configured as a load-balanced server farm or other configuration. In this regard, as shown in FIG. 3, the fleet management system 330 may include one or more processors 332, memory 334 storing data 336 and instructions 338, as well as a communications system 340 similar to those described above with respect to the one or more processors 210 and 312, memories 212 and 322, data 214 and 314, and instructions 216 and 316.

The data 316 and/or 336 may also store information about available ground-based additional nodes. These additional nodes may include, for example, movable ground-based nodes. For example, the movable ground-based node may include a road-mobile aerial vehicle, such as an aerostat, that can be driven to a particular location, deployed approximately 800 feet or more or less and used as an additional "gap-filling" node at least temporarily.

The stored information may include, for example, the current location of the ground-based additional node, the geographic locations which the ground-based additional node is able to reach over one or more given periods of time, bandwidth and communication capabilities (e.g. the frequency bands that can be supported), and other features, such as how high the additional node can be deployed, terrain (e.g. elevation and geographical maps), etc. In some instances, the controller or fleet management system may also need to consider whether and where backhaul connectivity for the mobile node. For example, certain types of these ground-based additional nodes will require fixed point-to-point microwave or fiber connectivity to the deployment site.

Each client device 350 may be a personal computing device or a server computing device with one or more processors 350, memory 352, data 356, and instructions 358 similar to those described above with respect to the one or more processors 210 and 312, memories 212 and 322, data 214 and 314, and instructions 216 and 316. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client devices 350 may include any device capable of processing instructions and transmitting data to and from humans and other computers including general purpose computers, network computers lacking local storage capability, and set-top boxes for televisions. In some embodiments, client devices may be associated with one or more SDN applications and may have one or more NBI drivers.

EXAMPLE METHODS

Figure 5:
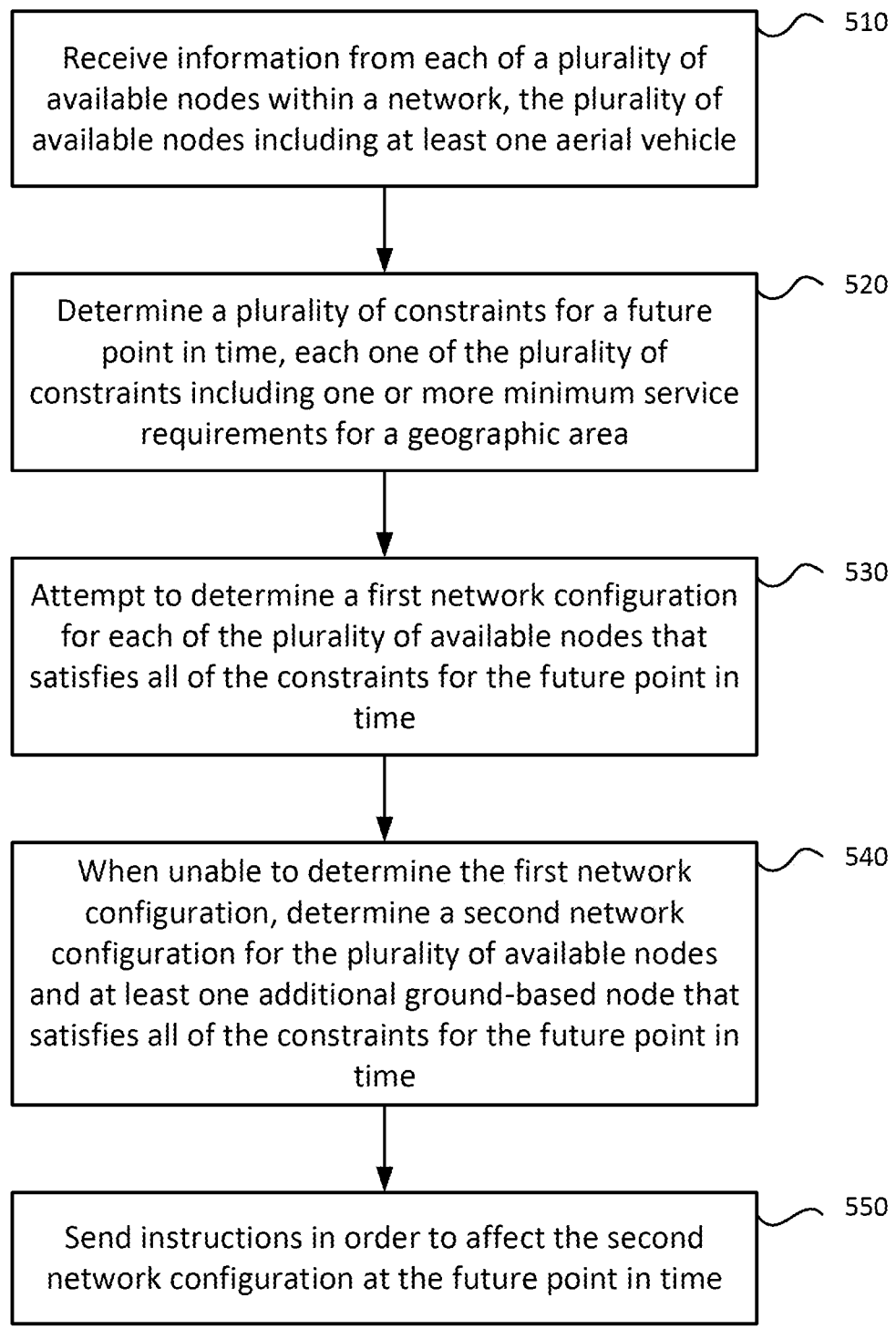
FIG. 5 is an example flow diagram 500 for determining network configurations in accordance with aspects of the disclosure.

In FIG. 5, flow diagram 500 for determining network configurations is shown in accordance with some of the aspects described above that may be performed by the one or more processors 312 of the controller 310 and/or one or more processors 332 of the fleet management system 330. While FIG. 5 shows blocks in a particular order, the order may be varied and that multiple operations may be performed simultaneously. Also, operations may be added or omitted.

At block 510, information from each of a plurality of available nodes within a network 100 is received. For instance, the controller 310 may periodically update the data of table 400 and models based on messages received from the HAPs and/or the fleet management system 330. Similarly, the fleet management system may update the information of data 336 based on messages received from the HAPs.

At block 520, a plurality of constraints for a future point in time is determined. Each one of the plurality of constraints may include one or more minimum service requirements for a geographic area. The controller 310 may schedule the tasking of the communication terminals in the network based at least in part on a difference between an amount of available bandwidth servicing a given ground station or a given geographic area and the minimum service requirements. The minimum service requirements amount may be a fixed amount, or may be variable based on an amount of client data being transmitted to or from the given ground station or client devices or ground stations in the given geographic area. For instance, the controller 310 may determine a network configuration including locations of the devices as well as communication links through the network in order to achieve the minimum service requirements for a particular location for the future point in time. This may include generating a plurality of constraints corresponding to the minimum service requirements for different geographic areas.

At block 530, determining a first network configuration for the plurality of available nodes that satisfies all of the constraints for the future point in time is attempted using the received information. The controller may then use other information, such as weather forecasts as well as the data of the table 400 and the aforementioned models to attempt to solve for a network configuration that satisfies all of the constraints as described above.

In the case of HAPs including aerial vehicles such as UAVs, balloons, etc., as part of the solution, the controller and/or a fleet management system may also generate flight paths or maps for these aerial vehicles to reach a desired location at the future point in time. For instance, as noted above, the controller may have access to a database, which contains a model of each node in the network. That model contains information that can be used to propagate each HAP's predicted physical motion over time as well as network capabilities (antenna patterns, supported bands & channels, networking interfaces, etc. etc.). At the same time, aa Fleet Management system may actually direct the motion of at least some of the HAPs, for instance aerial vehicles such as UAVs, balloons, etc., and determines where each of these HAPs should go, how each of these HAPs will navigate. The output of the fleet management system 330 may include flight paths and maps which are published both to the HAPs themselves in order to enable the HAPs to fly, steer, maneuver, or otherwise themselves in order to achieve the minimum service requirements as well as to the controller 310, which subscribes to those updates to keep its models of the motion of each HAP in-sync and up to date.

These flight paths or maps may be determined using weather forecasts, information about the current locations of HAPs (location, power, steering capabilities, etc.). The fleet management system 330 may provide the controller 310 with a simulated flight path of each HAP, and may determine flight paths/steering instructions them to provide the best network configuration to achieve the minimum service requirements. The controller 310 may determine when there is no solution to achieve the minimum service requirements, and in some instances, may send a signal to the fleet management system 330 or another system to dispatch additional HAPs, if possible.

Figure 6:
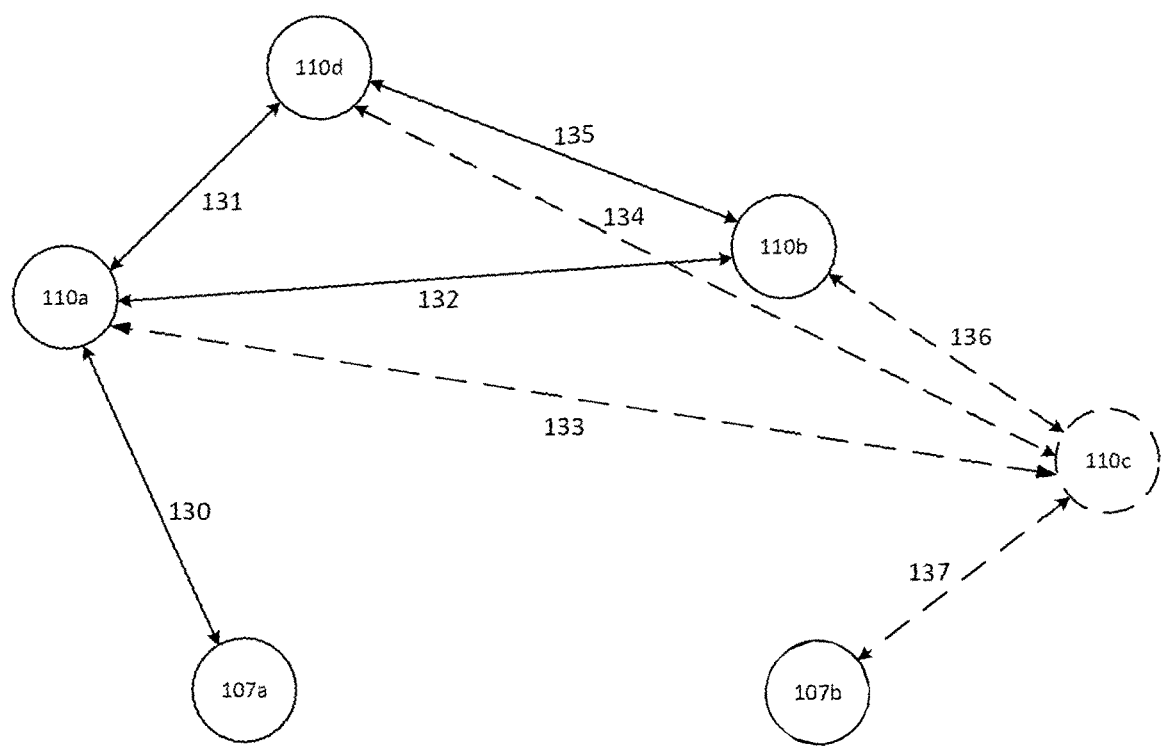
FIG. 6 is a functional diagram of a topology of a network shown in FIG. 1 in accordance with aspects of the disclosure.

However, in some instances, the controller 310 may be unable to determine or solve for a network configuration that meets all of the constraints, or rather, achieves the minimum service requirements for all geographic areas at the future point in time. For instance, it may take too long for a particular HAP to reach a given location, a HAP may have gone out of service or become unavailable unexpectedly, there are simply not enough available nodes, etc. As a result, no matter what network configuration, there may be an outage at a particular area or the minimum service requirements may not be achievable. For example, turning to example 600 of FIG. 6, HAP 110C may be predicted to be out of service at the future point in time. Because of this, communication links 133, 134, 136 and 137 may not be possible at the future point in time. As such, the controller 310 may be unable to solve for a network configuration that enables the minimum service requirements in the area of ground station 107b. As such, there will likely be an outage in the area of ground station 107b at the future point in time. At block 540, when unable to determine the first network configuration, a second network configuration for the plurality of available nodes and at least one additional ground-based node that satisfies all of the constraints for the future point in time is determined. For instance, the controller 310 may attempt to supplement the available notes with ground-based additional nodes. This may be achieved by the controller itself, or by the fleet management system, for instance, in response to a signal from the controller. For example, in response to determining that the controller 310 may be unable to determine or solve for a network configuration that meets all of the constraints, the controller 310 may send a signal to the fleet management system 330. The signal may indicate the future point in time for which the controller was unable to solve for a network configuration that meets all of the constrains or rather than an outage in the network is expected at the future point in time. In some instances, the signal may also indicate that one or more additional nodes are required.

Figure 7:
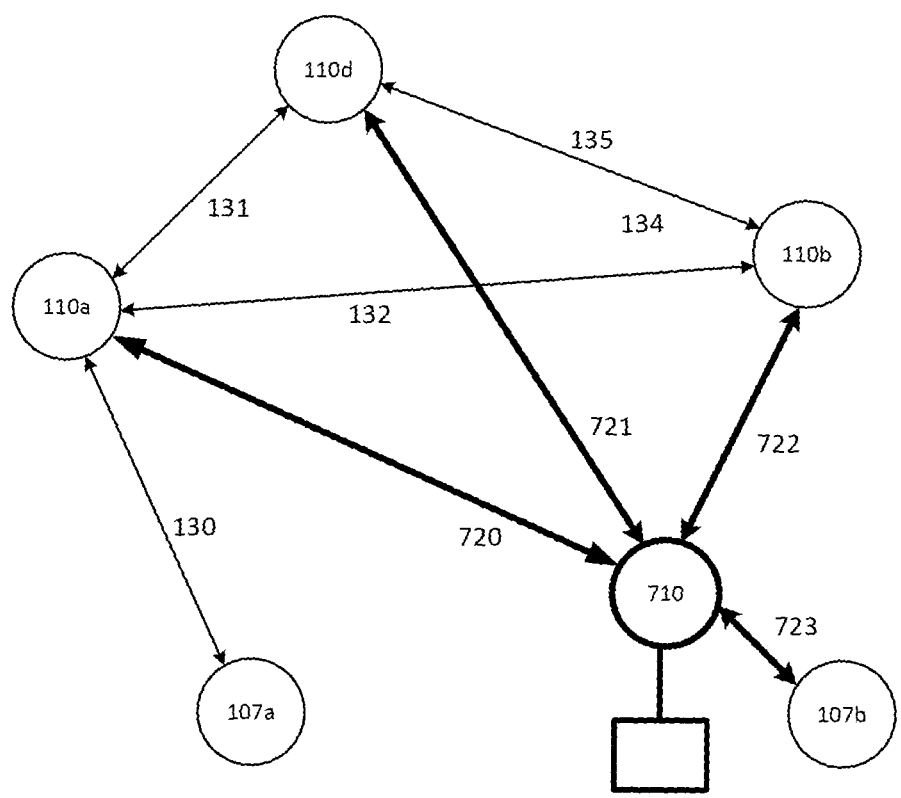

In response to receiving the signal, the fleet management system may determine whether an additional HAP can be dispatched (e.g. launched) by the future point in time. To do so, controller or the fleet management system may access any available information about any available ground-based additional nodes, for instance, from the data 316 and/or 336. The data 316 may provide the controller 310 and/or fleet management system 330 with the motion of the HAPs and also the coverage areas or user terminals for which minimum service requirements are or will not met at a future point in time. The controller or the fleet management system may then identify one or more additional ground nodes that can be dispatched in time in order to be used at the future point in time and that can be used within the coverage areas for which the minimum service requirements are or will not be met at the future point in time. For instance, turning to example 700 of FIG. 7, a ground-based node 710 could potentially be dispatched based on its altitude of deployment, the geographic locations that the ground-based node can be deployed to by the future point in time, the communications capabilities of the ground-based node, etc. If identified by the fleet management system, the fleet management system may send a signal to the controller indicating that the identified one or more additional ground nodes are available. At this point, the ground-based additional nodes need not yet be dispatched.

In response to the one or more additional ground nodes being identified, the controller 310 may attempt to solve for a new network configuration that includes one or more additional nodes. The controller may then use the data from table 400, the models, and any available information about the identified one or more additional ground nodes in order to attempt to solve for a network configuration that satisfies all of the constraints. In other words, the controller 310 may attempt to solve for a network configuration that both incorporates the identified one or more additional ground nodes and also satisfies all of the constraints. When the identified one or more ground-based nodes are included in the network configuration, the network configuration may include the identified one or more ground-based nodes generating communication links with one or more of the other nodes of the network including HAPs. For instance, returning to example 700 of FIG. 7, the ground-based node 710 can be dispatched to a particular location in order to facilitate new communication links 720-723 in order to achieve the minimum service requirements at the future point in time. For this dispatching, the fleet management system may provide information such as a time of departure, destination and route. The route can be updated real-time by existing road navigation software.

Alternatively, rather than dispatching the one or more additional ground nodes when unable to solve for a network configuration that meets the minimum service requirements, the controller and/or fleet management system could attempt to co-optimize both the HAPs and available ground-based nodes in a numerical solver of machine learning model. The controller and/or fleet management system could then select a solution that maximizes performance or minimize costs to the network. Any ground-based nodes needed to achieve the solution can then be dispatched as needed in order to achieve the minimum service requirements at the future point in time. At the same time, the fleet management system may provide the controller with a simulated flight path of each HAP for the selected solution, and may determine flight paths/steering instructions them to provide the best network configuration to achieve the minimum service requirements. Corresponding flight paths or maps may then be sent to the HAPS as described above.

Using ground-based nodes in certain circumstances may reduce the costs of configuring the network because there are costs involved with getting additional aerial nodes to locations. For example, during certain times of the year, the winds in a region may be unfavorable, or, for example, during winter, there may be less sunlight for solar panels on the HAPs. To overcome such challenges, additional nodes (e.g. ground-based nodes) may need to be deployed to maintain the same service levels as compared to the number of nodes deployed during more favorable times, thereby incurring additional costs on the network operator. In addition to the controller or fleet management system generating flight paths or maps for these HAPs to reach a desired location at the future point in time, the controller may also determine which additional nodes are required and at which locations they must be deployed by the future point in time.

At block 550, instructions are sent in order to affect the second network configuration at the future point in time. For instance, the controller 310 or fleet management system 330 may then send instructions to implement the network configuration. This may involve sending instructions to the available nodes to create the communication links through the network in order to achieve the minimum service requirements at the future point in time as well as sending flight paths or maps for various of the available nodes (e.g. the aforementioned HAPs) to reach a desired location at the future point in time. In this regard, a signal identifying the network configuration may be sent by the controller 310 to the fleet management system 330. In response, the fleet management system 330 may determine the flight paths or maps for various of the available nodes to reach the desired locations at the future point in time and send this information to each of the nodes. The fleet management system 330 or controller 310 may also dispatch the identified one or more additional nodes. For instance, the controller or fleet management system may generate an automated work request ticket, push notification (e.g. text or email), or even a phone call at some point (e.g. a week) in advance of the future point in time in order to enable human operators or the ground-based additional nodes themselves to be dispatched as needed to achieve the network configuration.

The features described above may provide for a reliable way for users to transmit data to different parts of the world. A communication network created using the features described may provide users with network coverage that is more robust to fade and outages. Because of this, end users of the communication network are more likely to use the network because it may provide more reliable transmission of data. In addition, because of the mobility of the nodes end users may therefore have increased accessibility to datacenters and other points of interest worldwide. Cost may also be a significant benefit. For example, covering a large, rural area with towers or aerostats is not generally economical, because each base station will likely too few users relative to such users' per-unit fixed costs. HAPS can affordably cover very wide areas; however, HAPs may not always offer enough availability at certain locations at certain times. The dynamic orchestration of the deployment and network configuration of road-mobile temporary base stations may enable rural coverage to be much more economically sustainable. Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of dispatching ground-based nodes of a network, the method comprises:
   receiving, by one or more processors, information from each of a plurality of available nodes within the network, wherein the plurality of available nodes includes at least one high-altitude platform;
   determining, by the one or more processors, a plurality of constraints for a future point in time, each one of the plurality of constraints including one or more minimum service requirement for a geographic area;
   determining, by the one or more processors, a network configuration for the plurality of available nodes and at least one additional ground-based node, wherein the network configuration satisfies the plurality of constraints for the future point in time when the at least one additional ground-based node is used; and
   sending, by the one or more processors, instructions in order to affect the network configuration at the future point in time, the instructions being configured to cause the at least one additional ground-based nodes to be dispatched, wherein the instructions include sending a signal identifying the network configuration to a fleet management system.

2. The method of claim 1, wherein the network configuration includes a communication link between the at least one high-altitude platform and the at least one additional ground-based node.

3. The method of claim 1, wherein determining the network configuration includes using location information for the at least one ground-based additional node as well as information about geographic locations the at least one additional ground-based additional node is able to reach over one or more given periods of time.

4. The method of claim 1, wherein determining the network configuration includes using information about communication capabilities of the at least one ground-based additional node.

5. The method of claim 1, wherein determining the network configuration includes limiting a number of any ground-based additional nodes used in the network configuration.

6. The method of claim 1, further comprising:
   prior to determining the network configuration, initially attempting, by the one or more processors, to determine a first network configuration for each of the plurality of available nodes that satisfies all of the constraints for the future point in time;
   when unable to determine the first network configuration, sending, by the one or more processors, a signal to a fleet management system remote from the one or more processors; and
   in response to sending the signal, receiving, by the one or more processors, information identifying the at least one additional ground-based node, and wherein determining the network configuration is in response to receiving the information.

7. The method of claim 1, further comprising, in response to receiving, by the fleet management system, the signal, sending a second signal to cause the at least one additional ground-based nodes to be dispatched.

8. The method of claim 1, further comprising, determining, by the fleet management system, a flight map for the at least one high-altitude platform.

9. The method of claim 8, wherein the flight map is at least partially determined by using weather forecasts and location, power, steering capabilities information about at least one high-altitude platform.

10. The method of claim 1, wherein the determining includes using information about an altitude at which the at least one ground-based additional node is deployable.

11. The method of claim 1, further comprising, in response to receiving, by the fleet management system, the signal, sending a third signal to direct motions of the at least one high-altitude platform.

12. A system for dispatching ground-based nodes of a network, the system comprising:
   a controller including one or more processors configured to:
   receive information from each of a plurality of available nodes within a network, the plurality of available nodes including at least one high-altitude platform;
   determine a plurality of constraints for a future point in time, each one of the plurality of constraints including one or more minimum service requirements for a geographic area;
   determine a network configuration for the plurality of available nodes and information about an altitude that at least one additional ground-based node is deployable, wherein the network configuration satisfies all of the constraints for the future point in time when the at least one additional ground-based node is used; and send instructions in order to affect the network configuration at the future point in time the instructions being configured to cause the at least one additional ground-based nodes to be dispatched, wherein the instructions include sending a signal identifying the network configuration to a fleet management system.

13. The system of claim 12, wherein the network configuration includes a communication link between the at least one high-altitude platform and the at least one additional ground-based node.

14. The system of claim 12, wherein the one or more processors are configured to determine the network configuration by using location information for the at least one ground-based additional node as well as information about geographic locations the at least one additional ground-based additional node is able to reach over one or more given periods of time.

15. The system of claim 12, wherein the one or more processors are configured to determine the network configuration by using information about communication capabilities of the at least one ground-based additional node.

16. The system of claim 12, wherein the one or more processors are further configured to:
prior to determining the network configuration, initially attempt to determine a first network configuration for each of the plurality of available nodes that satisfies all of the constraints for the future point in time;
when unable to determine the first network configuration, send a signal to a fleet management system remote from the one or more processors; and
in response to sending the signal, receive information identifying the at least one additional ground-based node, and wherein determining the network configuration is in response to receiving the information.

17. The system of claim 12, further comprising the fleet management system, and wherein the fleet management system includes one or more processors.

18. The system of claim 12, wherein the one or more processors of the fleet management system are configured to, in response to receiving the signal, send a second signal to cause the at least one additional ground-based nodes to be dispatched.

19. The system of claim 12, wherein the fleet management system is further configured to determine a flight map for the at least one high-altitude platform.

20. The system of claim 12, further configured to determine, by the fleet management system, a flight map for the at least one high-altitude platform.

* * * * *